(12) United States Patent
Kim

(10) Patent No.: US 8,862,549 B2
(45) Date of Patent: Oct. 14, 2014

(54) DATA MANAGEMENT METHOD AND APPARATUS OF PORTABLE TERMINAL

(75) Inventor: Sang Won Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 12/804,394

(22) Filed: Jul. 21, 2010

(65) Prior Publication Data

US 2011/0022568 A1   Jan. 27, 2011

(30) Foreign Application Priority Data

Jul. 21, 2009   (KR) .................. 10-2009-0066181

(51) Int. Cl.
*G06F 17/30* (2006.01)
*G06F 11/14* (2006.01)

(52) U.S. Cl.
CPC .... *G06F 17/30008* (2013.01); *G06F 17/30073* (2013.01); *G06F 11/1451* (2013.01)
USPC .......................................... 707/640; 711/165

(58) Field of Classification Search
CPC ................................................ G06F 17/30073
USPC ................................ 707/640; 711/2, 162, 165
See application file for complete search history.

(56) References Cited

U.S. PATENT DOCUMENTS

| | | | | |
|---|---|---|---|---|
| 5,920,826 | A  * | 7/1999  | Metso et al. | 455/557 |
| 2006/0286971 | A1 * | 12/2006 | Maly et al. | 455/415 |
| 2008/0005121 | A1 * | 1/2008  | Lam et al. | 707/10 |
| 2008/0263676 | A1 * | 10/2008 | Mo et al. | 726/28 |
| 2010/0042662 | A1 * | 2/2010  | Mao | 707/204 |

\* cited by examiner

*Primary Examiner* — Jorge A Casanova

(57) ABSTRACT

A data management method and apparatus of a portable terminal improves memory utilization efficiency using a data move/copy function which allows moving or copying the user data preserved in the non-volatile memory region of the memory of a portable terminal. A data management method for a portable terminal includes selecting at least one user data item in response to a selection request. An extended region for backup of the user data item is checked in response to a backup request. Transfer data corresponding to the user data item is created. The transfer data is stored in the extended region as a backup of the user data item.

22 Claims, 6 Drawing Sheets

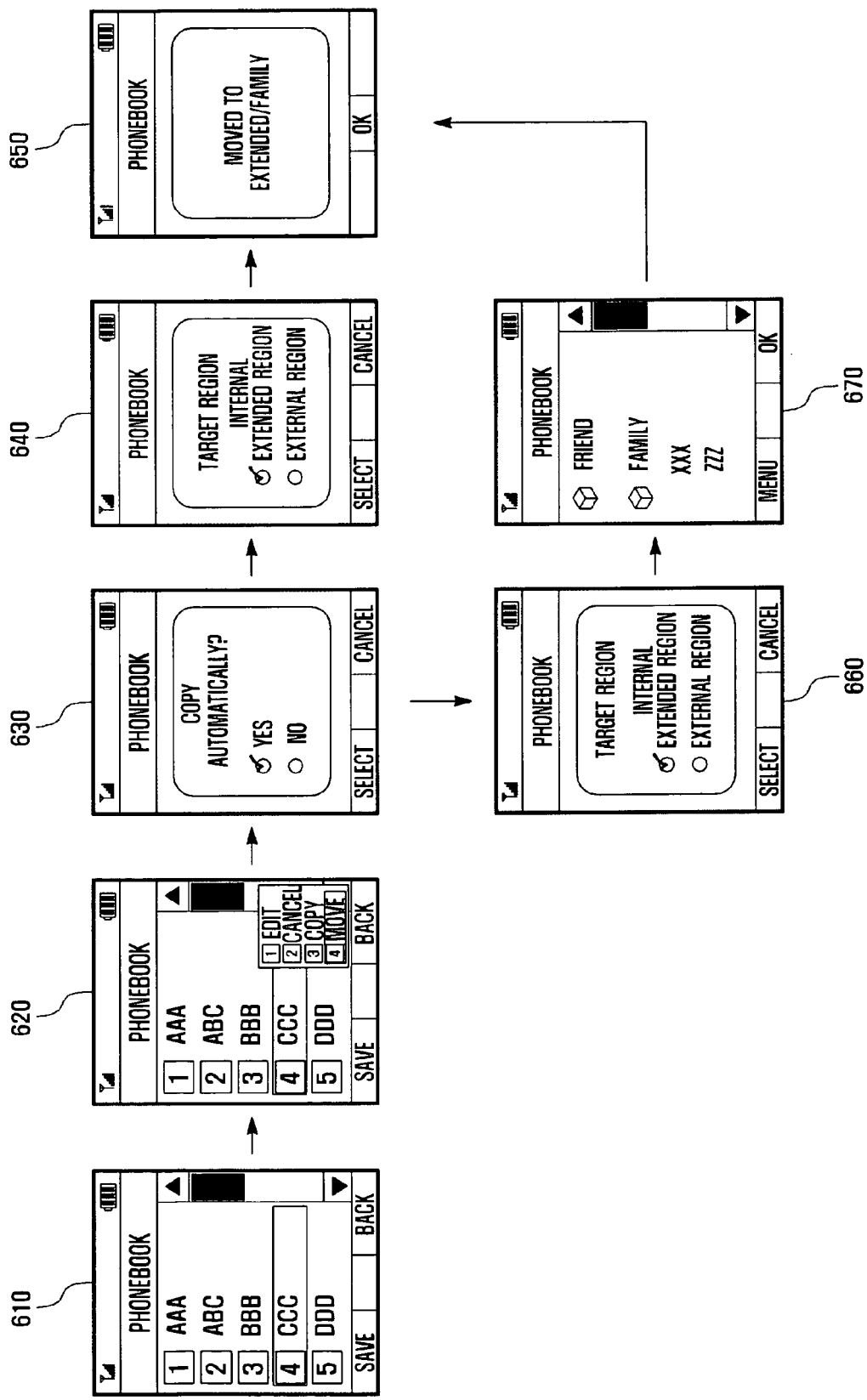

DATA MANAGEMENT METHOD AND APPARATUS OF PORTABLE TERMINAL

CROSS-REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Jul. 21, 2009 and assigned Serial No. 10-2009-0066181, the entire disclosure of which is hereby incorporated by reference.

TECHNICAL FIELD OF THE INVENTION

The present invention relates to a portable terminal and, in particular, to a data management method and apparatus of a portable terminal for improving memory utilization efficiency with a data move/copy function which allows moving or copying the user data preserved in the non-volatile memory region of the memory of a portable terminal.

BACKGROUND OF THE INVENTION

Typically, the memory of a portable terminal includes Read Only Memory (ROM) for storing the programs that control the portable terminal, Non-Volatile Memory (NVM) for storing various user data, and Random Access Memory (RAM) for temporarily storing data generated while the programs are running.

The NVM can retain the stored information even when the portable terminal powers off so that the stored information can be used upon the power-on of the portable terminal. The NVM can include a redial memory for recording the most recently dialed phone number, a received call memory for recording the phone numbers of the received calls, a missed call memory for recording the phone numbers of the missed call, and a phonebook memory for storing phonebook data such as list of phone numbers and names.

Meanwhile, there can be a situation for which it is necessary to delete or edit the contents stored in a specific memory region of the non-volatile memory for the memory management purpose while using the portable terminal. This is because a specific memory region, e.g. phonebook memory region, is limited to some extent on the manufacturer's design. With regard to the phonebook memory, the memory space assigned for the phonebook data is limited in size. Accordingly, when the given memory space is full, the user has to delete or move some of the phonebook data in order to add a new phonebook data item to the phonebook memory.

When the user has decided to delete an old phonebook data item to add a new one, the old phonebook data may need to be jotted down or remembered by the user for future usage. Also, it can be cumbersome to manually re-enter the deleted phonebook data item back into the portable terminal afterward.

In order to secure the memory space for the phonebook data or backup the phonebook data, the user can copy at least one phonebook data item from the internal memory of the portable terminal to an external storage medium. However, the copied or backed up data is likely to be stored in a data format different from its original. Assuming a phonebook data item is stored within the portable terminal in a data format with the information of a name, phone number 1, phone number 2, phone number 3, e-mail address, resident address, and group information, this original data format is not maintained when it is copied or backed up to the external storage. Accordingly, in order for the user to recover the phonebook data from the external storage, it has to be by entering the deleted information of each phonebook data item, resulting in user inconvenience. Therefore, there is a need to improve memory utilization efficiency with a data move/copy function

SUMMARY OF THE INVENTION

To address the above-discussed deficiencies of the prior art, it is a primary object to provide a data management method and apparatus of a portable terminal that is capable of configuring memory regions by a user.

Also, the present invention provides a data management method and apparatus of a portable terminal that allows the user to adjust memory space of a specific memory region to a predetermined extent.

Also, the present invention provides a data management method and apparatus of a portable terminal that is capable of intra-memory data move/copy within a nonvolatile memory, resulting in improvement of memory utilization efficiency.

Furthermore, the present invention provides a data management method and apparatus of a portable terminal that is capable of moving the user data between specific areas in a memory while maintaining the original data format of the user data.

In accordance with an aspect of the present invention, a data management method for a portable terminal includes selecting at least one user data item in response to a selection request. An extended region is checked for backup of the user data item in response to a backup request. Transfer data corresponding to the user data item is created. The transfer data stored in the extended region as a backup of the user data item.

In accordance with another aspect of the present invention, a data management method for a portable terminal includes detecting a backup request for backing up user data stored in an internal storage region of the portable terminal. Transfer data representing the user data is generated in response to the backup request. The transfer data is stored into an internal extended region or an external region as a backup of the user data. The user data is maintained in the internal storage region or deleting the user data from the internal storage region based on a backup mode after storing the transfer data.

In accordance with another aspect of the present invention, a portable terminal includes a user interface configured to receive user input and a memory configured to store user data. The portable terminal also includes a controller coupled to the user interface, the display, and the memory. The controller is configured to detect a backup request from the user input for backing up the user data stored in an internal storage region of the memory, generate transfer data representing the user data in response to the backup request, store the transfer data into one of an internal extended region of the memory and an external storage device as a backup of the user data, and determine a backup mode of the backup request that indicates one of maintaining the user data in the internal storage region and deleting the user data from the internal storage region after storing the transfer data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a sample user interface sequence for copying user data from a basic storage region to an extended storage region in the portable terminal according to an embodiment of the present invention.

DETAILED DESCRIPTION OF THE INVENTION

Figure 1A:
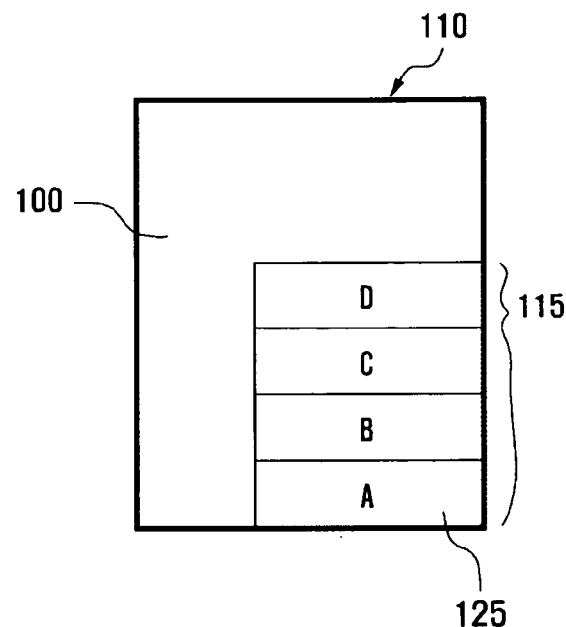
FIGS. 1a and 1b illustrate memory utilizations of the portable terminal according to an embodiment of the present invention.

FIGS. 1a through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

The details concerning the types of memory, storage unit of memory, name of memory in the following description are intended only to help understanding of the present invention. Accordingly, the present invention is not limited thereto, and it will be obvious to those skilled in the art that various changes and modifications may be made therein without departing from the spirit of the invention.

In the following description, the term 'user data' denotes all the types of data generated while the portable terminal executes a function or acquired from outside (e.g. another portable terminal or specific server), such as phonebook data, message data (including Short Message Service (SMS) data, Multimedia Message Service (MMS) data, E-mail Message Service (EMS) data, and such), Personal Information Management (PIM) data, Call log data, and multimedia data such as still picture, motion picture, audio, and such.

In the following, the description is directed to the phonebook data as a representative example of user data stored in the nonvolatile memory of a portable terminal. However, the user data is not limited to the phonebook data but can be various types of data as aforementioned.

In the present invention, an efficient memory management method for a portable terminal is proposed. Particularly in some embodiments of the present invention, a backup function is proposed for moving or copying the data preserved within the memory, particularly nonvolatile memory, of the portable terminal to other internal storage region or an external storage medium. In some embodiments of the present invention, the nonvolatile memory region can be partitioned according to the user's manipulation such that it is possible for the user to adjust the memory spaces of the memory regions assigned for the types of the user data within the nonvolatile memory, resulting in improvement of the memory management efficiency.

In the following description, the target storage region to which the user data copied from a specific storage region of the nonvolatile memory is stored is referred to as 'extended region'. The extended region can be the entire region of the nonvolatile memory except for the region where the current function is running or an external storage medium attached to the portable terminal.

A description is made of the operation for the move/copy of the user data stored within a specific region of the memory of the portable terminal to another region of the memory or to an external storage medium. However, the portable terminal according to the present invention is not limited to the following description but can be applied in various embodiments.

Figure 1B:
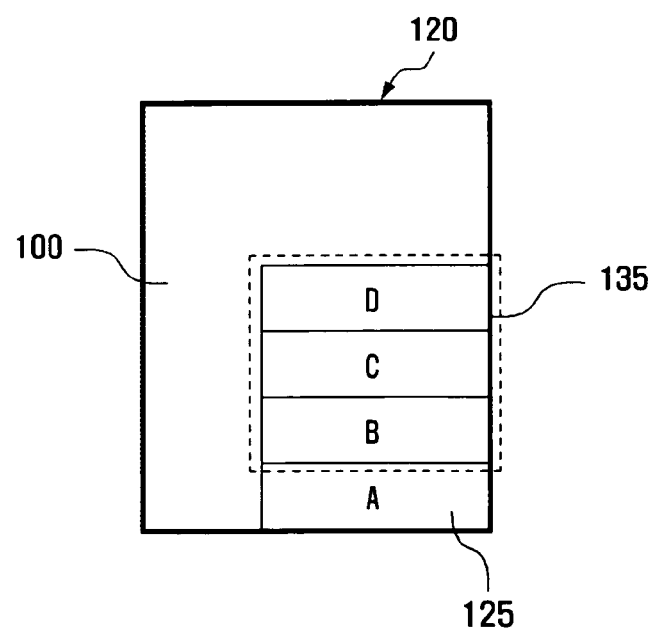

FIGS. 1a and 1b illustrate utilizations of a memory of the portable terminal according to an embodiment of the present invention. In FIGS. 1a and 1b, a region of the memory is assigned for storing the user data.

Referring to FIGS. 1a and 1b, the memory 100 stores the information related to the operations of the portable terminal. The information includes the operating system of the portable terminal, program data associated with application programs, and user data. The user data corresponds to the aforementioned data. Particularly, the memory 100 includes the storage region which can retain the stored information even when the portable terminal powers off. This region can be implemented with a nonvolatile memory, and the user data can be stored in the user data storage region 115 of the nonvolatile memory. That is, the user data storage region 115 is the region that includes a predetermined storage capacity for storing the user data in the storage region of the memory 100.

In an embodiment of the present invention, the user data storage region 115 can be operated with a basic region which is assigned per user and an extended region for moving user data.

The user data storage region 115 can be divided into a plurality of storage regions according to the types of the user data. In FIGS. 1a and 1b, the user data storage region 115 is further divided into storage region A, storage region B, storage region C, and storage region D. In this situation, the user data storage region 115 can be composed of an outgoing call storage region for storing the outgoing call information (e.g.

outgoing call phone numbers), an incoming call storage region for storing the incoming call information (e.g. incoming call phone numbers), a missed call storage region for storing the missed call information (e.g. missed call phone numbers), a multimedia storage region for storing multimedia data (e.g. dynamic/static video data, music file, and such), a message storage region for storing message-related information, and a phonebook storage region for storing phonebook information (e.g. phone number, name, image, and such) corresponding to user configuration.

In the following, a description is made under the assumption in that the storage region A is the phonebook storage region 125. The storage regions A, B, C, and D belong to the basic region.

In an embodiment of the present invention, a backup functions is provided for moving or copying the user data stored in the user data storage region 115 of the memory 100. In the conventional portable terminal, the user data can only be stored into or deleted from the storage regions assigned per user within the user data storage region. Also, the conventional portable terminal does not provide any user data move or copy function between per-user storage regions and allows moving only the user data stored in a specific storage region to an external storage medium.

Referring to FIGS. 1a and 1b, if the user requests to store the phonebook data as a phonebook data item according to the user configuration, the portable terminal stores the phonebook data into the phonebook storage region 125 as a phonebook data item. Here, the phonebook data can include image, name, at least one phone number, e-mail address, birthday, designated ringtone, group, address, memo, and such.

When the phonebook storage region 125 is full or does not have enough capacity to store the phonebook data, the user can cancel storing the phonebook data item composed of the input phonebook data or try to store the phonebook data item after deleting at least one of the previously stored phonebook data items. Also, the user may secure the storage capacity of the phonebook data region 125 by moving previously store phonebook data to an external storage for storing the newly generated phonebook data item into the phonebook data region 125. However, when the phonebook data item is moved to the external storage, the phonebook data constituting the phonebook data item is curtailed into simplified phonebook data, i.e. modified in data format. Such phonebook data modification is described with reference to FIGS. 2a and 2b.

Figure 2A:
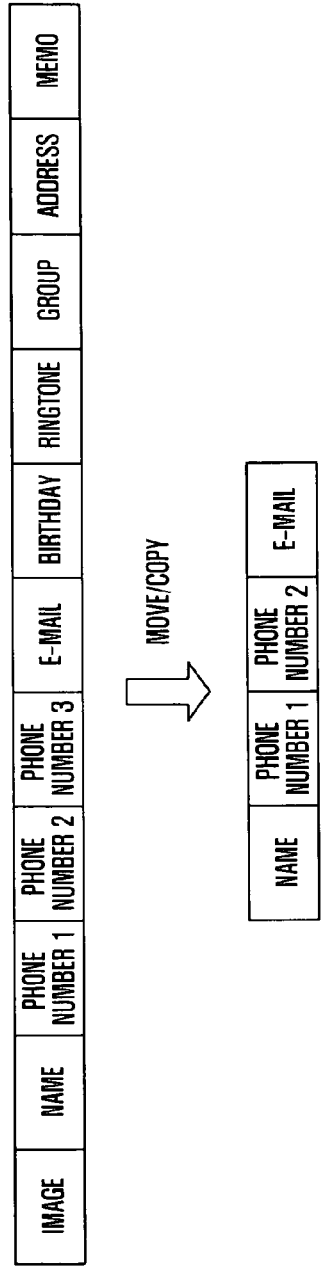
FIG. 2a illustrates data formats of the phonebook data before and after the move or copy from the storage region of a conventional portable terminal to an external storage according to an embodiment of the present invention.
Figure 2B:
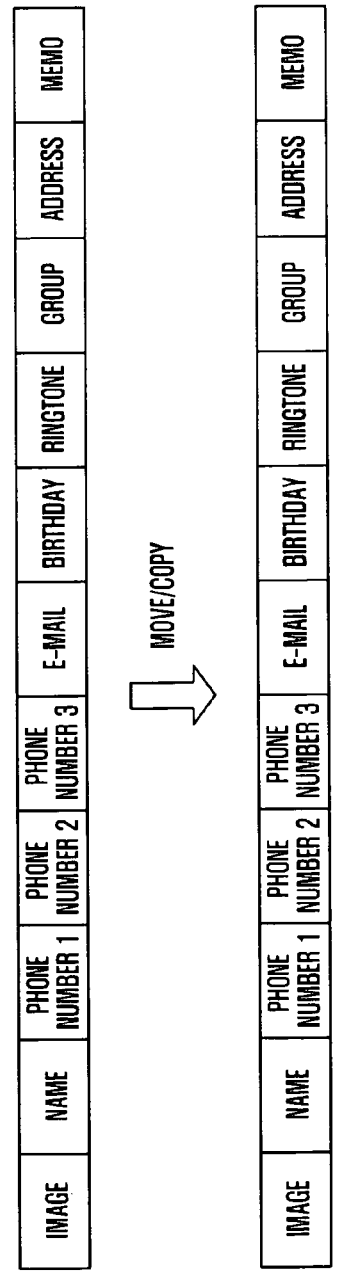
FIG. 2b illustrates the data format of the phonebook data before and after move or copy from the storage region (basic region) to an extended region (internal or external storage) according to an embodiment of the present invention.

FIG. 2a illustrates data formats of the phonebook data before and after the move or copy from the storage region of a conventional portable terminal to an external storage, and FIG. 2b illustrates the data format of the phonebook data before and after move or copy from the storage region (basic region) to an extended region (internal or external storage) according to an embodiment of the present invention.

Referring to FIGS. 2a and 2b, the user can create a phonebook data item by inputting the phonebook data of a name (nickname), at least one phone number, an image, an e-mail address, a birthday, a ringtone, a group, an address, and a memo. In the examples of FIGS. 2a and 2b, the phonebook data item includes a name field, three phone number fields (phone number 1, phone number 2, and phone number 3), an e-mail address field, a birthday field, a ringtone field, a group field, an address field, and a memo field. And the portable terminal generates a phonebook data item consisting of the field values and stores the phonebook data item into the storage region of the portable terminal.

In the conventional method, when the phonebook data item is moved or copied to an external storage (e.g. external storage medium), the phonebook data item is modified into a simplified format consisting of basic information fields before being moved or copied to the external storage as shown in FIG. 2a. Accordingly, in order for the user to recover the original phonebook data item afterword, it is required to input the values of the information fields that have been deleted in the data backup process.

Meanwhile, in the data move/copy method according to an embodiment of the present invention, the data format of the phonebook data item is not changed, as shown in FIG. 2b, even when it is moved or copied to an extended region of the internal memory of the portable terminal or an external storage.

As described above, the present invention proposes a memory management method that is capable of managing the user data storage region 115 of the memory 100, and thus improving the user convenience.

In an embodiment of the present invention, a function for reconfiguring the user data storage region 115 assigned per user data among the storage regions of the memory 100 is provided. In an embodiment of the present invention, a method for moving or copying the user data preserved in the user data storage region 115 to an external storage without change in data format is proposed.

For this purpose, the basic region assigned per user data in the user data storage region is used as the extended region in the present invention. The extended region is another storage region of the target area to which the user data stored in one of the storage regions of the user data storage region 115 is moved. That is, the extended region can be the storage regions of the user data storage region 115 except for the storage region in which the current function is executed or an external storage medium attached to the portable terminal.

For example, assuming that the storage region A is the phonebook storage region 125 and the user requests move of the phonebook data, the phonebook storage region 125 becomes the basic region in which the current function is executed, and a set 135 of the storage regions B, C and D becomes the extended region to which the move-requested phonebook data can be moved. Accordingly, even when the basic region is full or its capacity is insufficient for accommodating the newly generated user data, it is possible to secure the capacity for storing the newly generated user data in the basic region by moving the previously stored user data from the basic region to the extended region or store the newly generated user data into the extended region directly.

In an embodiment of the present invention, when it is tried to store the newly generated user data into the extended region or move/copy the user data of the basic region to the extended region, the user data can be managed with an address table associated with the basic region. The address table can be formed as table 1 below:

TABLE 1

| Type | ID | Basic region | Extended region |
|------|------|--------------------------|--------------------------|
| A | 0001 | Phonebook storage region | Type D storage region |
| A | 0010 | Phonebook storage region | Type A storage region |
| C | 0101 | Type A storage region | Phonebook storage region |
| D | 1001 | Type B storage region | Type D storage region |

As shown in table 1, the portable terminal manages the user data that is moved/copied to the extended region with the type information indicating the type of the user data, identification information (ID) of the user data, the basic region information about the storage region assigned according to the data type of the user data, and the extended region information about the extended region to which the user data is moved/copied/stored in the form of a table. That is, the portable terminal manages the moved/copied/stored user data in the form of a database.

In this manner, the user data stored in different storage regions can be managed by category. That is, the user data that includes the same data type are aggregately used.

In the embodiment of FIG. 1b, assuming that '500' phonebook data items from data item '1' to data item '500' are stored in the phonebook storage region 125, '200' phonebook data items from data item '501' to data item '700' are stored in the storage region B of the extended region 135, and '300' phonebook data items from data item '701' to data item '1000' are stored in the storage region D of the extended region 135; the portable terminal manages the phonebook data items stored in such distributed manner in the form of the table 2 below:

TABLE 2

| Category | Storage region | Phonebook data | Note |
| --- | --- | --- | --- |
| Phonebook 1 | Basic region | Data 1 to data 500 | Phonebook storage region |
| Phonebook 2 | Basic region | Data 501 to data 700 | Storage region B |
| Phonebook 3 | Basic region | Data 701 to data 1000 | Storage region D |

Referring to table 2, the portable terminal categorizes the phonebook data items into phonebook 1, phonebook 2, and phonebook 3 according to the storage regions in which the phonebook data items are stored.

According to an embodiment of the present invention, the phonebook data items categorized into the phonebook 1, phonebook 2, and phonebook 3 are managed in one phonebook category so as to maintain the relationship of the phonebook data. According to an embodiment of the present invention, the phonebook data items are categorized into subgroups (phonebook 1, phonebook 2, and phonebook 3) and managed by storage region (basic region and extended region).

When using the conventional method, the '1000' phonebook data items are stored in the phonebook storage region without categorization by storage region such that the portable terminal has to load all of the '1000' phonebook data items in the initial booting process. This means that the conventional portable terminal manages the entire phonebook data within a single category. Because the portable terminal must load the entire phonebook data in the initial booting process, the phonebook data loading time is delayed as the amount of the phonebook data increases.

In accordance with an embodiment of the present invention, however, the phonebook data stored in the basic region (e.g. phonebook storage region) can be designated to be loaded in the initial booting process such that only the '500' phonebook data items, i.e. phonebook data item '1' to phonebook data item '500', are loaded, resulting in reduction of the phonebook data loading time. That is, the portable terminal loads the phonebook data items stored in the basic region in the booting process so as to reduce its booting time.

As described above, the user data storage region 115 includes a basic region assigned for storing a relatively small amount of user data and an extended region assigned variable storage capacity for moving/copying the user data stored in the basic region. The extended region can be assigned within the basic region of the user data storage region 115 and the external region of an external storage medium.

Figure 3:
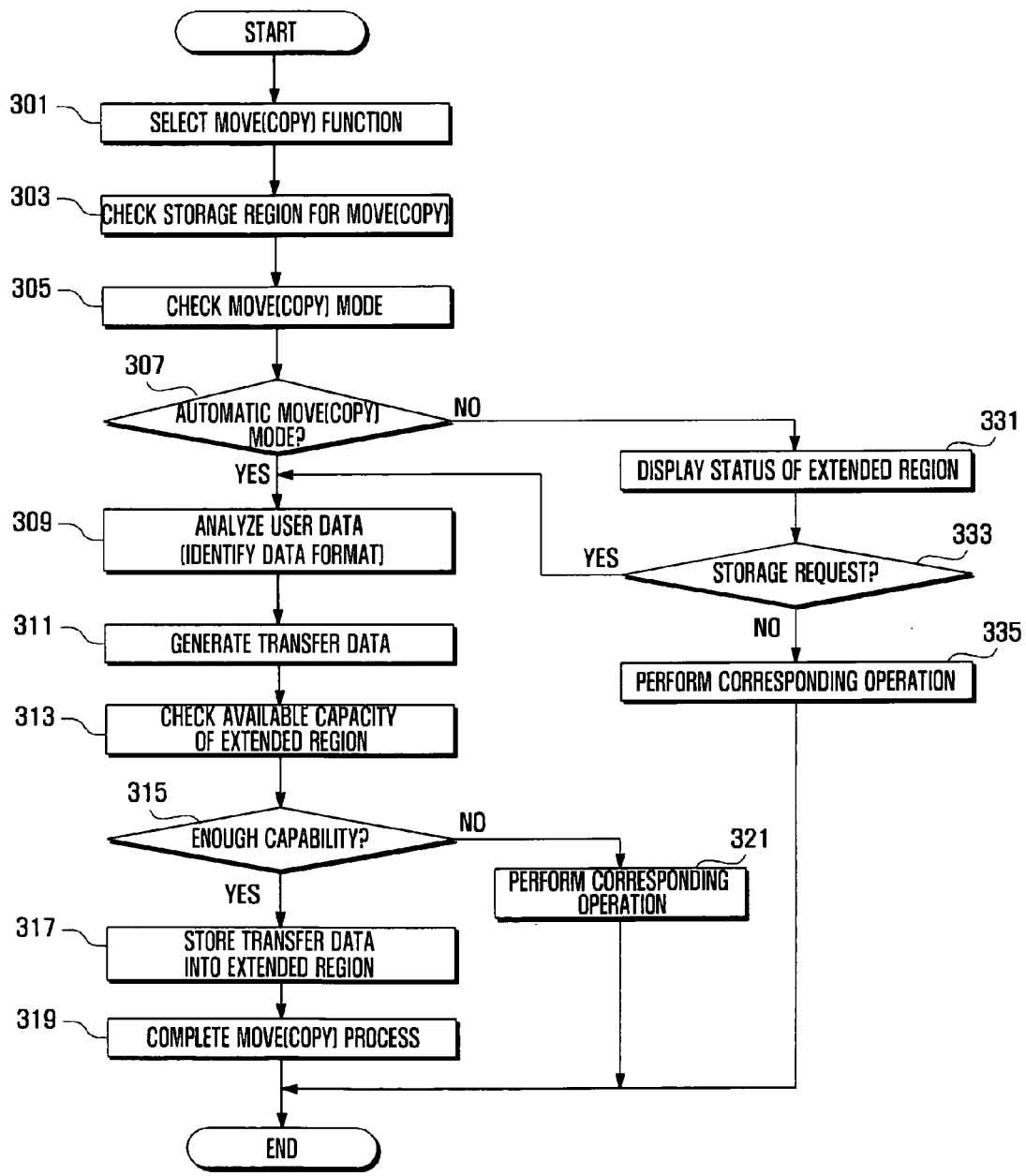
FIG. 3 illustrates a process for moving (copying) user data in the portable terminal according to an embodiment of the present invention.

FIG. 3 illustrates a method for moving (copying) user data in the portable terminal according to an embodiment of the present invention.

Referring to FIG. 3, the portable terminal first detects a move (copy) function request for moving (copying) at least one user data item (301) and checks the storage region to which the corresponding user data item is moved (copied) upon detecting the move (copy) function request (303). Here, the portable terminal determines whether to move the user data to an extended region or an external region. When it is determined to move the user data to the extended region, the portable terminal selects one of the storage regions designated as the extended region. Here, the portable terminal provides at least one user data list in response to a user request such that the user can select at least one user data item to be moved (copied).

Next, the portable terminal checks the current move (copy) mode for moving (copying) the user data item (305) and determines whether the current move (copy) mode is an automatic move (copy) mode or manual move (copy) mode (307).

If the current move (copy) mode is the automatic move (copy) mode, the portable terminal analyzes the user data item requested for move (copy) (309). For example, the portable terminal checks the format information of the user data item as described above with reference to FIGS. 1a to 2b. When the user data item is a phonebook data item, the portable terminal checks the phonebook information of the phonebook data item. For example, the portable terminal checks the values of the information fields, i.e. name (nickname), at least one phone number, image, e-mail, birthday, ringtone, group, address, and memo that are input by the user when the phonebook data item is created.

Next, the portable terminal generates a transfer data in the format corresponding to the user data item based on the analysis result (311). The transfer data is the data to be moved (copied) to the extended region or the external region and can be the data representing the original user data and stored temporarily within a buffer. The portable terminal can delete or maintain the user data within the basic region depending on whether the user data is moved or copied after sending the temporarily generated transfer data to the extended region or the external region.

After generating the transfer data, the portable terminal checks the available capacity of the extended region (or external region) (313) and determines whether the user data can be stored in the extended region (or external region) (315). That is, the portable terminal checks the size of the user data requested to be moved (copied), i.e. the transfer data, and the available storage capacity of the extended region (internal extended region or external region) to which the user data is stored and determines whether the target storage region has enough storage capacity to store the transfer data.

If it is determined that the extended region (internal extended region or external region) has enough storage capacity to store the transfer data, the portable terminal sends the transfer data to the extended region (internal extended region or external region) (317). Next, the portable terminal completes the move (copy) operation (319). If the user data was requested to be moved, the portable terminal deletes the corresponding user data from the basic region. If the user data was requested to be copied, the portable terminal maintains the corresponding user data in the basic region.

If it is determined that the extended region (internal extended region or external region) does not have enough storage capacity to store the transfer data at block 315, the portable terminal performs a predetermined operation (321). For example, the portable terminal can output an alarm message notifying that it is impossible to move (copy) the user data due to the capacity shortage or sends as much user data as available to the target memory region and outputs an alarm message notifying of transferred and the transfer-failed data and transfer failure reason.

If the current move (copy) mode was determined to be the manual move (copy) mode at block 307, the portable terminal outputs the status of the extended region checked at block 303 (331). For example, if there is at least one data item (folder or user data item) stored previously in the extended region, the portable terminal can provide a list of the at least one data item.

Next, the portable terminal detects the user selection on the list (higher category or a subcategory in a folder) and determines whether a save request is input (333). If a save request is detected, the procedure goes to block 309 such that the portable terminal executes the move (copy) operation. Otherwise, if a save request is not detected at block 333, the portable terminal performs a predetermined operation (335). For example, the portable terminal can terminate the user data move (copy) operation initiated at block 301 or perform a user data reselection process or a move (copy) mode reconfiguration process.

The method for moving (copying) user data from a basic region to another storage region (extended region in the memory or storage region of an external storage medium) according to an embodiment of the present invention has been described hereinabove. The user data move and copy operations explained with reference to FIGS. 1a to 3 are described hereinafter in more detail. However, the operations of the present invention are not limited to following description and can be applied in various embodiments.

Figure 4:
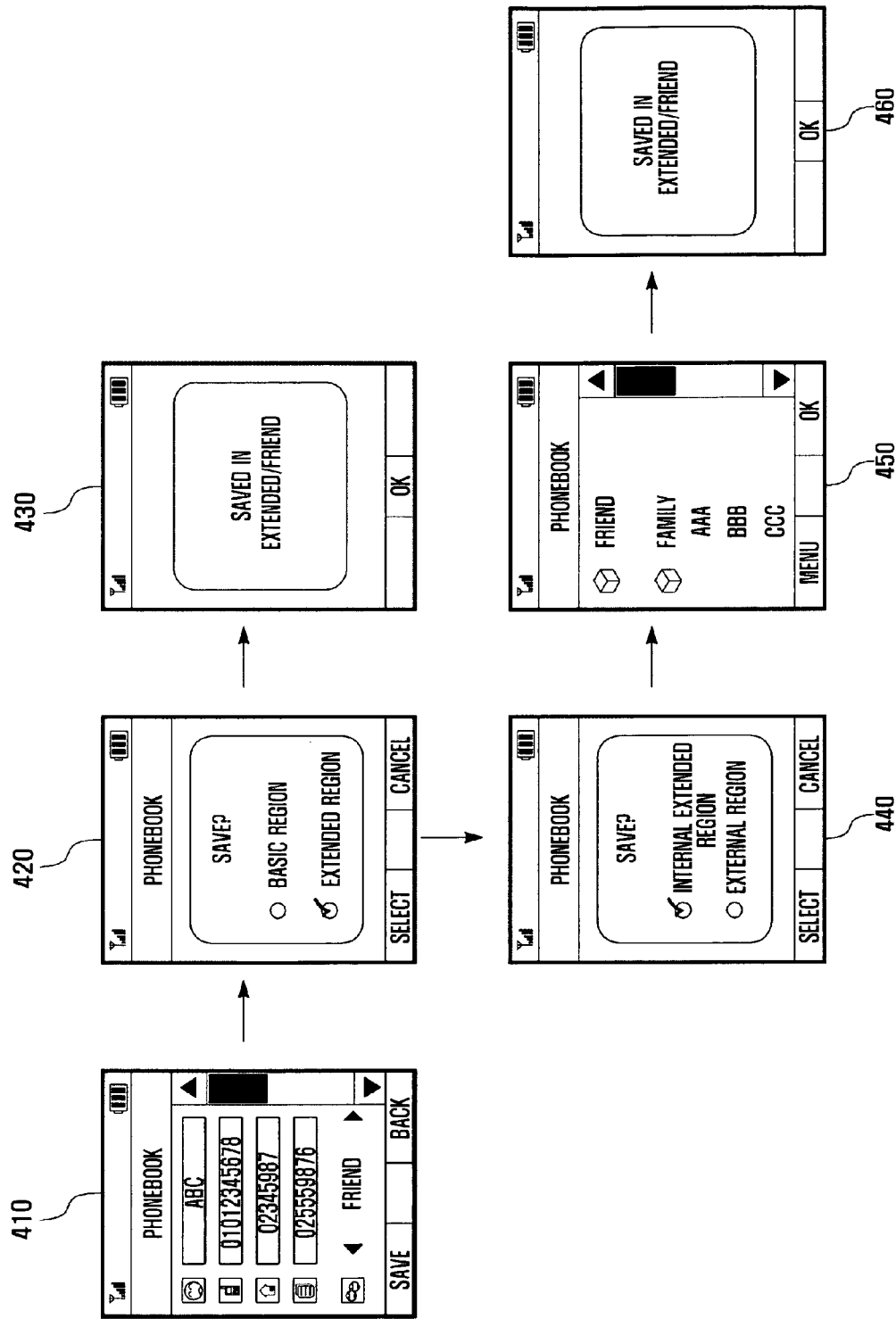
FIG. 4 illustrates a sample user interface sequence for storing user data within an internal memory of the portable terminal according to an embodiment of the present invention.

FIG. 4 illustrates a sample user interface sequence for storing user data within an internal memory of the portable terminal according to an embodiment of the present invention.

In FIG. 4, a process for handling a phonebook data item as the user data is depicted. However, the user data can be any of various types of data such as message data (e.g. SMS, MMS, and such), call data (e.g. outgoing/incoming call data), captured data (e.g. still and motion picture data), and such, that can be stored and processed in the portable terminal.

Referring to FIG. 4, a phonebook data item can be composed of at least one user information element as shown in the screen image 410. As shown in the screen image 410, a phonebook data item includes a name, phone numbers (cellular phone number, resident phone number, and office phone number), and a group. The phonebook data item is composed of name: 'ABC', first phone number: '01012345678', second phone number: '02345987', third phone number: '025559876', and group: 'FRIEND'. Although not shown in the screen image 410, the phonebook data item can further include image, e-mail, address, ringtone, memory, and such. The user can create a phonebook data item by inputting the individual information elements and storing the phonebook data item in an intended storage region.

If a save command is detected after the completion of the user input, the portable terminal outputs a message soliciting the user to select a memory region for storing the input phonebook data item. The user can select one of the basic region and the extended region on the message as shown in the screen image 420. If one of the basic region and the extended region is selected, the portable terminal stores the phonebook data item into the selected region according to a preconfigured mode. The portable terminal can be configured with an automatic save mode or a manual save mode.

After the extended region is selected for storing the phonebook data item in the portable terminal configured with the automatic save mode, if the save command is detected, the portable terminal checks the data type and category of the phonebook data item. That is, the portable terminal identifies the data type of the user data as phonebook data and the group of the phonebook data item as 'friend' upon detecting the save command input. The information identification can be done by parsing the user information input in the phonebook data configuration process, and the user information can be parsed in the phonebook data format as described with reference to FIGS. 2a and 2b.

The portable terminal checks that the save-requested data is the phonebook data and belongs to the category of 'friend' through the identification process such that it searches for the category 'friend' in the extended region and stores the phonebook data into the storage region corresponding to the category 'friend'. When the category 'friend' does not exist in the extended region, the portable terminal can create the category 'friend' and store the phonebook data item into the storage region corresponding to the category 'friend'. Next, the portable terminal outputs an alarm message notifying that the phonebook data item is stored in the 'friend' storage region of the extended region as shown in the screen image 430.

After the extended region is selected for storing the phonebook data item in the portable terminal configured with the manual save mode, if the save command is detected, the portable terminal outputs a popup message soliciting the user to select a storage region of the extended region for storing the phonebook data item as shown in the screen image 440. The popup message presents the 'internal extended region' assigned in the internal memory of the portable terminal and the 'external region' (external storage medium) attached to the portable terminal such that the user can select one of the 'internal extended region' and the 'external region'.

If one of the internal extended region and the external region is selected by the user, the portable terminal stores the phonebook data item into the selected storage region. Assuming that the internal extended region is selected, the portable terminal outputs the information of the internal extended region as shown in the screen image 450. For example, if any previously stored user data exist in the internal extended region, the portable terminal displays the user data. If group folders corresponding to the categories within the internal extended region exist, the portable terminal displays the folders corresponding to the categories. If user data and group folders within the internal extended region exist, the portable terminal displays the folders and user data.

The user can select a storage region for storing the phonebook data item on the screen displaying the folders and user data as shown in the screen image 450 and requests to save the phonebook data item into the selected storage region. In response to the user request, the portable terminal stores the phonebook data item into the selected storage region and outputs a popup message notifying that the phonebook data item is stored in the requested storage region, e.g. 'extended region/friend', as shown in the screen image 460.

Figure 5:
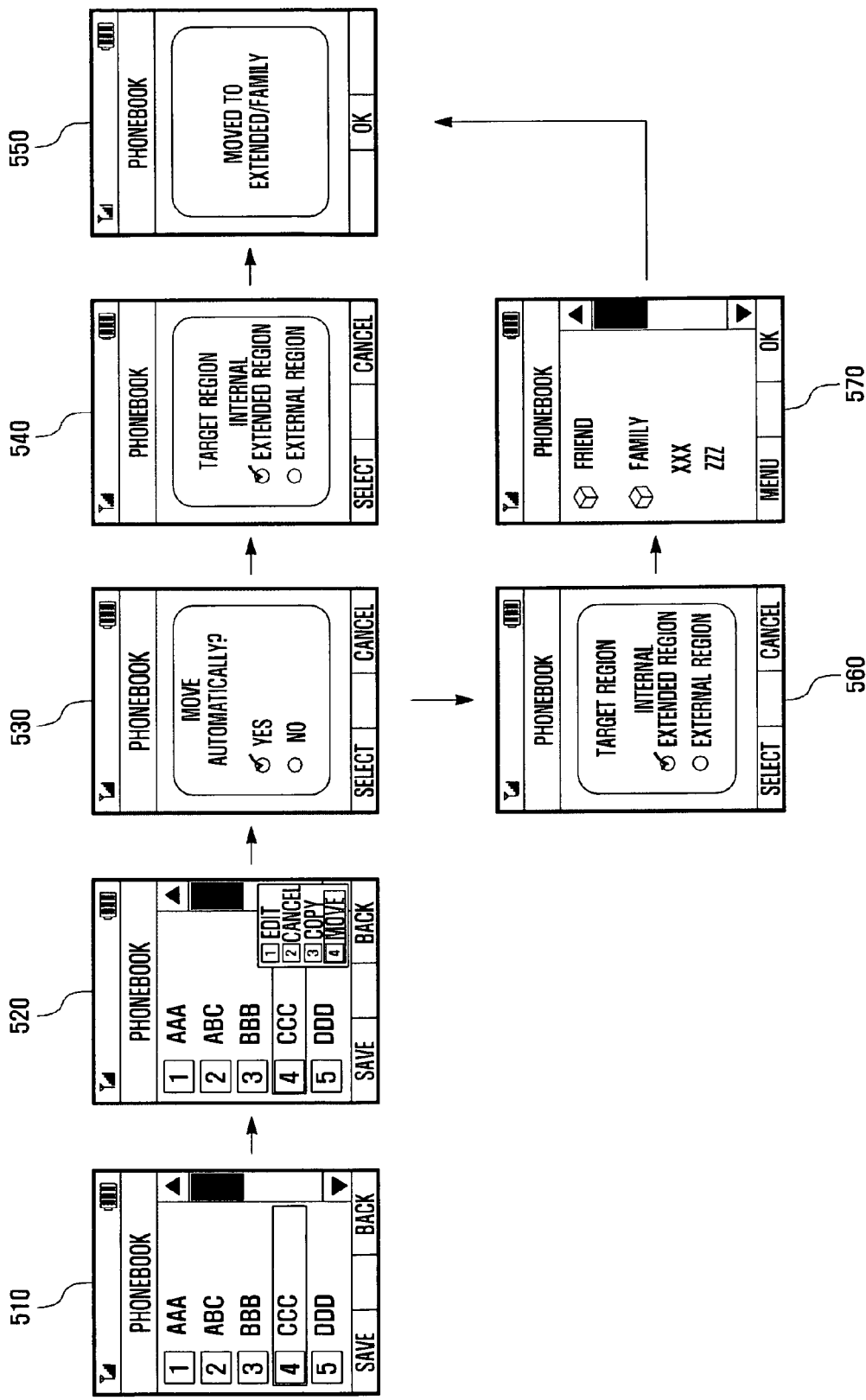
FIG. 5 illustrates a sample user interface sequence for moving user data stored in a storage region to another in the portable terminal according to an embodiment of the present invention.

FIG. 5 illustrates an example user interface sequence for moving user data stored in a storage region to another in the portable terminal according to an embodiment of the present invention.

In FIG. 5, a process for moving user data from a basic region (e.g. phonebook data region), which is assigned per user data type in the internal memory of the portable terminal, to an extended region of the internal memory is depicted. Although the description is directed to phonebook data, the user data move process can be applied to any type of data such as message data (e.g. SMS and MMS data), call data (outgoing/incoming call data), captured data (still/motion picture data), and such, that can be store in the portable terminal.

Referring to FIG. 5, the portable terminal displays the user data requested by the user as shown in the screen image 510. The user data presented in the screen image 510 are phonebook data. If the phonebook data are requested by the user, the portable terminal searches the basic region of the internal memory for the phonebook data which include at least one phonebook data item.

While the phonebook data are displayed as shown in the screen image 510, the user can select at least one phonebook data item. The selected phonebook data item can be highlighted so as to be distinguished from other unselected phonebook data items.

After the phonebook data item is selected, a 'move' command can be input by user manipulation as shown in the screen image 520. If the 'move' command input is detected, the portable terminal displays a confirmation request message asking for confirmation of the 'move' command execution as shown in the screen image 530. In the screen image 530, a move mode selection request message is displayed in the form of a popup message.

The move mode selection request message is presented with a text "move automatically?" such that the user can determine whether to move the selected phonebook data item in automatic move mode or manual move mode. If one of the move modes is selected by the user, the portable terminal executes the move command in the selected move mode. As aforementioned, the move modes include the automatic move mode and the manual move mode.

For example, if a 'yes' option is selected on the automatic move mode selection request message, the portable terminal executes the move command in the automatic move mode and, otherwise if 'no' option is selected, executes the move command in the manual move mode.

When the automatic move mode is selected, the portable terminal displays a target region selection request message as shown in the screen image 540. That is, the portable terminal displays a target region selection request message, in the form of a popup window, asking for the user to select a target storage region to which the phonebook data item is moved.

As shown in the screen image 540, the target region selection request message includes an 'internal extended region'option and an 'external region' option such that the portable terminal moves the phonebook data item to one of the internal extended region and the external region according to the user selection.

If the 'internal extended region' option is selected by the user, the portable terminal checks the data type and category of the phonebook data item. The portable terminal identifies that the phonebook data item has the data type of phonebook data and belongs to a category, e.g. a group. The category can be 'friend', 'family', or 'office'. In FIG. 5, the selected phonebook data item belongs to the 'family' category.

Once it is identified that the phonebook data item has the phonebook data type and belongs to the 'family' category, the portable terminal checks the storage region designated for the 'family' category in the extended region to move the phonebook data item. When the storage region designated for the 'family' category does not exist, the portable terminal creates the storage region of 'family' category and then moves the phonebook data item to the 'family' category storage region. After moving the phonebook data item, the portable terminal outputs a notification message notifying that the phonebook data item is moved to the 'extended region/family', e.g. "moved to the extended region/family," as shown in the screen image 550.

When the manual move mode is selected, the portable terminal displays a target region selection request message as shown in the screen image 560. That is, the portable terminal displays a region selection request message that includes an 'internal extended storage region' option and an 'external region' option in the form of a popup message to ask for the user to select a target storage region to which the phonebook data item is moved. Once one of the 'internal extended storage region' option and the 'external region' option is selected by the user, the portable terminal can move the phonebook data item to the selected storage region.

If the internal extended region option is selected, the portable terminal displays the contents of the internal extended region as shown in the screen image 570. If there are previously stored move/copy-intended user data in the internal extended region, the portable terminal can display these user data. Also, if there are group folders corresponding to at least one category in the internal extended region, the portable terminal displays the group folders. If there are group folders and user data in the internal extended region, the portable terminal displays both the group folders and user data.

The user can select the target storage region on the target region selection request message on the screen displaying the folders and user data as shown in the screen image 570 and then request for the move of the phonebook data item into the selected target storage region. If the move request is detected, the portable terminal moves the phonebook data item to the target region and displays a notification message notifying that the phonebook data item is moved to the 'extended region/family' as shown in the screen image 550.

FIG. 6 illustrates a sample user interface sequence for copying user data from a basic storage region to an extended storage region in the portable terminal according to an embodiment of the present invention.

In FIG. 6, a process for copying user data from a basic region (e.g. phonebook data region), which is assigned per data type in the internal memory of the portable terminal, to an extended region within the internal memory is depicted. Although the description is directed to phonebook data, the user data copy process can be applied to any type of data such as message data (e.g. SMS and MMS data), call data (e.g. outgoing/incoming call data), captured data (e.g. still/motion picture data), and such, that can be store in the portable terminal.

Referring to FIG. 6, the portable terminal displays the user data requested by the user as shown in the screen image 610. The user data presented in the screen image 610 are phonebook data.

If the phonebook data are requested by the user, the portable terminal searches the basic region of the internal memory for the phonebook data which include at least one phonebook data item.

While the phonebook data are displayed as shown in the screen image 610, the user can select at least one phonebook data item. The selected phonebook data item can be highlighted so as to be distinguished from other unselected phonebook data items.

After the phonebook data item is selected, a 'copy' command can be input by user manipulation as shown in the screen image 620. If the 'copy' command input is detected, the portable terminal displays a confirmation request message asking for confirmation of the 'copy' command execution. In the screen image 630, a copy mode selection request message is displayed in the form of a popup message.

The copy mode selection request message is presented with a text "copy automatically?" such that the user can determine whether to copy the selected phonebook data item in automatic copy mode or manual copy mode. If one of the copy modes is selected by the user, the portable terminal executes the copy command in the selected copy mode. As aforementioned, the copy modes include the automatic copy mode and the manual copy mode.

For example, if a 'yes' option is selected on the copy mode selection request message, the portable terminal executes the copy command in the automatic copy mode and, otherwise if 'no' option is selected, executes the copy command in the manual copy mode.

When the automatic copy mode is selected, the portable terminal displays a target region selection request message as shown in the screen image 640. That is, the portable terminal displays a target region selection request message, in the form of a popup window, asking for the user to select a target storage region to which the phonebook data item is copied.

As shown in the screen image 640, the target region selection request message includes an 'internal extended region' option and an 'external region' option such that the portable terminal copies the phonebook data item to one of the internal extended region and the external region according to the user selection.

If the 'internal extended region' option is selected by the user, the portable terminal checks the data type and category of the phonebook data item. The portable terminal identifies that the phonebook data item has the data type of phonebook data and belongs to a category, e.g. a group. The category can be 'friend', 'family', or 'office'. In FIG. 6, the selected phonebook data item belongs to the 'family' category.

Once it is identified that the phonebook data item has the phonebook data type and belongs to the 'family' category, the portable terminal checks the storage region designated for the 'family' category in the extended region to copy the phonebook data item. If the storage region designated for the 'family' category does not exist, the portable terminal creates the storage region of 'family' category and then copies the phonebook data item to the 'family' category storage region. After copying the phonebook data item, the portable terminal outputs a notification message notifying that the phonebook data item is copied to the 'extended region/family', e.g. "copied to the extended region/family," as shown in the screen image 650.

When the manual copy mode is selected, the portable terminal displays a target region selection request message as shown in the screen image 660. That is, the portable terminal displays a region selection request message that includes an 'internal extended storage region' option and an 'external region' option in the form of a popup message to ask for the user to select a target storage region to which the phonebook data item is copied. Once one of the 'internal extended storage region' option and the 'external region' option is selected by the user, the portable terminal can copy the phonebook data item to the selected storage region.

If the internal extended region option is selected, the portable terminal displays the contents of the internal extended region as shown in the screen image 670. If there are previously stored move/copy-intended user data in the internal extended region, the portable terminal can display these user data. Also, if there are group folders corresponding to at least one category in the internal extended region, the portable terminal displays the group folders. If there are the group folders and user data in the internal extended region, the portable terminal displays both the group folders and user data.

The user can select the target storage region on the target region selection request message on the screen displaying the folders and user data as shown in the screen image 670 and then request for the copy of the phonebook data item in the selected target region. If the copy request is detected, the portable terminal copies the phonebook data item to the target region and displays a notification message notifying that the phonebook data item is copied to the 'extended region/family' as shown in the screen image 650.

Although not shown in FIGS. 4 to 6, the portable terminal can perform a process for editing or deleting at least one user data item selected from at least one of the storage region partitioned according to the user configuration.

The operations executed in the user data move/copy processes described with reference to FIGS. 1a to 6 can be initiated by the user manipulation such as touch gestures on a touchscreen and key selections on a normal keypad. This means that the data management method of the present invention can be applied to all types of portable terminals including folder-type, bar-type, and slide-type portable terminals as well as equivalent touchscreen-enabled terminals.

The portable terminal can be any type of electronic device supporting data communication and multimedia functions such as mobile communication terminal operating based on specific communication protocols, Portable Multimedia Player (PMP), digital broadcast player, Personal Digital Assistant (PDA), music player (e.g. MP3 player), and such.

As described above, the data management method and apparatus of a portable terminal according to the present invention, is capable of backing up the user data by moving/copying the user data within the internal memory or to an external storage without change of the original data format, resulting in improvement of data management efficiency. Also, the data management method and apparatus of a portable terminal according to the present invention is advantageous to reduce the system boot time by managing the user data in a portioned manner.

The above-described methods according to the present invention can be realized in hardware or as software or computer code that can be stored in a recording medium such as a CD ROM, an RAM, a floppy disk, a hard disk, or a magneto-optical disk or downloaded over a network, such that the methods described herein can be rendered in such software using a general purpose computer, or a special processor or in programmable or dedicated hardware, such as, but not limited to, an ASIC or FPGA. As would be understood in the art, the computer, the processor or the programmable hardware include memory components, e.g., RAM, ROM, Flash, and such, that may store or receive software or computer code that when accessed and executed by the computer, processor or hardware implement the processing methods described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A data management method for a portable terminal, the method comprising:

storing user data in a plurality of basic regions of a user data storage region, wherein each of the plurality of basic regions store different types of user data and the plurality of basic regions are used as extended regions;
selecting user data stored in one basic region of the plurality of basic regions;
identifying at least one other basic region of the plurality of basic regions as an extended region for backup of the selected user data in response to a backup request;
generating transfer data corresponding to the selected user data; and
storing the transfer data in the at least one other basic region as the backup of the selected user data,
wherein the selected user data of the one basic region and the transfer data of the at least one other basic region are managed in one category.

2. The data management method of claim 1, wherein the extended region further comprises an external region of an external storage medium attached to the portable terminal.

3. The data management method of claim 1, further comprising determining whether to delete the selected user data after being backed up.

4. The data management method of claim 3, wherein determining whether to delete the selected user data comprises:
deleting, when the backup request is a move request, the selected user data from the user data storage region after storing the transfer data in the at least one other basic region; and
maintaining, when the backup request is a copy request, the selected user data in the user data storage region after storing the transfer data in the at least one other basic region.

5. The data management method of claim 1, wherein the user data stored in the basic and extended regions and assigned to an identical category are managed in a database form.

6. The data management method of claim 1, further comprising identifying available capacity of the extended region before storing the transfer data in the at least one other basic region.

7. The data management method of claim 1, wherein the transfer data is stored in the at least one other basic region in a data format that is identical to a data format of the selected user data.

8. The data management method of claim 2, further comprising determining whether the extended region is one of individually separated basic regions or the external region.

9. The data management method of claim 2, wherein storing the transfer data comprises:
identifying a category of the selected user data;
determining whether a category region corresponding to the category of the selected user data exists in the extended region; and
creating the category region in the extended region in response to determining that the category region corresponding to the category of the selected user data does not exist in the extended region.

10. The data management method of claim 9, wherein storing the transfer data comprises saving the transfer data into the category region of the extended region as the backup of the selected user data in response to determining that the category region exists in the extended region.

11. A data management method for a portable terminal, the method comprising:
storing user data in a plurality of basic regions of an internal storage region of a memory, wherein each of the plurality of basic regions store different types of user data and the plurality of basic regions are used as extended regions;
detecting a backup request for backing up user data stored in a certain basic region among the plurality of basic regions of the internal storage region;
generating transfer data representing the user data;
storing the transfer data into at least one other basic region of the plurality of basic regions as an extended region for backup of the user data; and
determining a backup mode of the backup request that indicates one of maintaining the user data in the internal storage region and deleting the user data from the internal storage region after storing the transfer data,
wherein the user data of the certain basic region and the transfer data of the at least one other basic region are managed in one category.

12. The data management method of claim 11, further comprising:
deleting, when the backup mode of the backup request is a move request, the user data from the internal storage region after storing the transfer data in the at least one other basic region; and
maintaining, when the backup mode of the backup request is a copy request, the user data in the internal storage region after storing the transfer data in the at least one other basic region.

13. The data management method of claim 11, wherein storing the transfer data comprises:
identifying a category of the user data;
determining whether a category region corresponding to the category of the user data exists in the extended region; and
creating the category region in the extended region when the category region corresponding to the category of the user data does not exist in the extended region.

14. The data management method of claim 13, wherein storing the transfer data further comprises saving the transfer data into the category region of the extended region as the backup of the user data if the category region exists in the extended region.

15. A portable terminal comprising:
a user interface configured to receive user input;
a memory configured to store user data in a plurality of basic regions of an internal storage region, wherein each of the plurality of basic regions store different types of the user data; and
a controller coupled to the user interface, a display, and the memory, the controller configured to:
detect a backup request from the user input for backing up the user data stored in a certain basic region among the plurality of basic regions of the internal storage region of the memory,
generate transfer data representing the user data,
store the transfer data into at least one other basic region of the plurality of basic regions as an extended region for backup of the user data, and
determine a backup mode of the backup request that indicates one of maintaining the user data in the internal storage region and deleting the user data from the internal storage region after storing the transfer data,
wherein the at least one other basic region of the internal storage is used as the extended region, and
wherein the user data of the certain basic region and the transfer data of the at least one other basic region are managed in one category.

16. The portable terminal of claim 15, wherein the controller is further configured to:
delete the user data from the internal storage region after storing the transfer data in the at least one other basic region in response to determining that the backup mode of the backup request is a move request; and maintain the user data in the internal storage region after storing the transfer data in the at least one other basic region in response to determining that the backup mode of the backup request is a copy request.

17. The data management method of claim 1, wherein the basic region is a storage region specific to a particular type of the at least one user data.

18. The data management method of claim 11, wherein the basic region is a storage region specific to a particular type of the user data.

19. The portable terminal of claim 15, wherein the basic region is a storage region specific to a particular type of the user data.

20. The data management method of claim 1, wherein:
identifying the extended region comprises identifying information fields of the at least one user data from format information in response to the backup request; and generating the transfer data comprises generating the transfer data in a data format corresponding to the at least one user data to maintain the information fields.

21. The data management method of claim 11, wherein generating the transfer data comprises:

identifying information fields of the user data from format information; and generating the transfer data representing the user data in a data format corresponding to the user data to maintain the information fields in response to the backup request.

22. The portable terminal of claim 15, wherein the controller is configured to identify information fields of the user data format information and generate the transfer data representing the user data in a data format corresponding to the user data to maintain the information fields in response to the backup request.

* * * * *